United States Patent
Muxworthy et al.

(10) Patent No.: US 10,920,995 B2
(45) Date of Patent: Feb. 16, 2021

(54) WASTE-LIQUID HEAT RECOVERY

(71) Applicants: Anthony Todd Muxworthy, Richmond (GB); Thomas Vincent Damian Braniff, Cottingham (GB)

(72) Inventors: Anthony Todd Muxworthy, Richmond (GB); Thomas Vincent Damian Braniff, Cottingham (GB)

(*) Notice: Subject to any disclaimer, the term of this patent is extended or adjusted under 35 U.S.C. 154(b) by 22 days.

(21) Appl. No.: 16/479,870

(22) PCT Filed: Jan. 19, 2018

(86) PCT No.: PCT/GB2018/050161
§ 371 (c)(1),
(2) Date: Jul. 22, 2019

(87) PCT Pub. No.: WO2018/134612
PCT Pub. Date: Jul. 26, 2018

(65) Prior Publication Data
US 2020/0208848 A1  Jul. 2, 2020

(30) Foreign Application Priority Data
Jan. 23, 2017 (GB) .................................. 1701098.4

(51) Int. Cl.
*F24D 17/00* (2006.01)
*E03C 1/00* (2006.01)
(Continued)

(52) U.S. Cl.
CPC ............ *F24D 17/0005* (2013.01); *E03C 1/00* (2013.01); *F24D 17/02* (2013.01); *F28D 1/0213* (2013.01);
(Continued)

(58) Field of Classification Search
CPC ........ F24D 17/0005; F24D 17/02; E03C 1/00; F28D 1/0213; F28D 21/0012
(Continued)

(56) References Cited

FOREIGN PATENT DOCUMENTS

| CN | 202973661 U | 6/2013 |
|---|---|---|
| CN | 103925823 A | 7/2014 |

(Continued)

OTHER PUBLICATIONS

Intellectual Property Office, Great Britan Search Report for Great Britain Patent Applicaton No. 1701098.4, dated Aug. 25, 2017, (3 pages), South Wales, United Kingdom.
(Continued)

*Primary Examiner* — Christine J Skubinna
(74) *Attorney, Agent, or Firm* — Alston & Bird LLP

(57) ABSTRACT

The present invention relates to a method and apparatus for transferring heat energy from a waste-liquid, wherein the apparatus (100) comprises at least one heat exchange element (107) for transferring heat energy from waste liquid in a first container (101) to a first target fluid, at least one heat pump element (111) for transferring heat energy from waste-liquid transferred from the first container to the further container (102), at least one selectively operable exit-valve element (115) for selectively providing at least one fluid communication path for allowing waste-liquid to exit from the further container, and at least one controller element for selectively operating the heat pump element to transfer heat energy from waste-liquid in the further container to a further target fluid and/or for selectively operating the at least one selectively operable exit-valve element.

24 Claims, 5 Drawing Sheets

(51) Int. Cl.
    *F24D 17/02* (2006.01)
    *F28D 1/02* (2006.01)
    *F28D 21/00* (2006.01)
    *F28D 20/00* (2006.01)

(52) U.S. Cl.
    CPC .... *F28D 21/0012* (2013.01); *E03C 2001/005* (2013.01); *F24D 2200/20* (2013.01); *F28D 2020/0082* (2013.01)

(58) Field of Classification Search
    USPC .......................................................... 164/47
    See application file for complete search history.

(56) References Cited

FOREIGN PATENT DOCUMENTS

| | | |
|---|---|---|
| CN | 204665664 U | 9/2015 |
| CN | 105546618 A | 5/2016 |
| DE | 102012104278 B3 | 7/2013 |
| FR | 3038974 A1 | 1/2017 |
| WO | WO-2006/101405 A2 | 9/2006 |
| WO | WO-2009/123456 A1 | 10/2009 |

OTHER PUBLICATIONS

International Searching Authority, International Search Report and Written Opinion for International Application No. PCT/GB2018/050161, dated Apr. 24, 2018, (11 pages), European Patent Office, The Netherlands.

WASTE-LIQUID HEAT RECOVERY

CROSS REFERENCE TO RELATED APPLICATIONS

This application is a National Stage Application, filed under 35 U.S.C. § 371, of International Application No. PCT/GB2018/050161, filed Jan. 19, 2018, which application claims priority to United Kingdom Application No. 1701098.4, filed Jan. 23, 2017; the contents of both of which as are hereby incorporated by reference in their entirety.

BACKGROUND

Related Field

The present invention relates to the recovery of heat energy from waste-liquid, such as domestic or commercial grey/black-water and/or rainwater. In particular, but not exclusively, the present invention relates to a method and apparatus for using a heat exchanger and/or selectively using a heat pump to transfer heat energy from waste-liquid to target fluid such as a water supply and/or a heat sink.

Description of Related Art

Domestic and/or commercial buildings typically include four separate types of water system. These are an incoming mains water supply which is generally connected to the mains water system and at a pressure of around 2-5 bar, a hot water system which includes a water heater, typically in the form of a domestic hot water (DHW) cylinder and/or boiler for heating water from the mains water supply, a grey-water waste system which transfers waste water from, for example, a shower, bath, basin, washing machine, dishwasher or the like, to the drainage system, and a black-water waste system which transfers, for example, WC waste to the drainage system.

The mains water is heated, e.g. in the DHW cylinder, for a shower or bath, so the temperature of grey-water leaving the building is typically higher than the temperature of the mains water supply and thus valuable heat energy is being wasted. Attempts to recover heat energy from grey-water are known. However, the heat exchange surfaces of conventional heat exchangers for recovering heat from grey-water are prone to fouling up, resulting in very low efficiencies and poor performance, and hence there has been little commercial drive for promoting their installation. Furthermore, conventional heat exchangers for recovering heat from grey-water are difficult to design for maximum efficiency due to the inconsistent flow regimes in a grey-water heat recovery system. For example, there are two key flow regimes in a grey-water heat recovery apparatus; continuous and discontinuous flow regimes. Continuous usage is where the incoming mains water for a water heater is flowing through the heat exchanger of the heat recovery apparatus at the same time and relative flow-rate as the outgoing hot grey-water is flowing around the heat exchanger. For example, in a shower, incoming cold water is flowing through the heat exchanger of the heat recovery apparatus at the same time and relative flow-rate that the outgoing hot grey-water, i.e. soiled water from the shower tray, is flowing around the heat exchanger. Therefore, there is continuous heat exchange from the outgoing hot grey-water to the incoming cold mains water flowing through the heat exchanger located in the outgoing hot grey-water, and thus heat transfer from the grey-water to the cold mains water supply for the water heater is relatively efficient. Discontinuous usage is where the incoming cold water is flowing through the heat exchanger whilst the grey-water from which heat energy is to be transferred from is not flowing. For example, when running a bath, cold water is being supplied into the building but the grey-water, i.e. waste water from the bath, is not flowing until the bath is emptied, which is usually when the incoming cold water has stopped flowing. Therefore, there is discontinuous heat exchange from the outgoing hot grey-water to the incoming cold mains water flowing through the heat exchanger located so as to transfer heat energy from outgoing hot grey-water, and thus heat transfer from the grey-water to the cold mains water supply for the water heater is particularly limited.

It has therefore been difficult to adequately determine a size of grey-water waste heat recovery equipment due to the fact that current design methodology and design equations for surface area heat transfer rely on constant fluid flow of both the target fluid within the heat exchanger to be heated and the fluid which heat energy is being transferred from, i.e. a constant flow of grey-water on one side of the heat exchanger and a constant flow of cold water to be warmed up, i.e. heatable water, on the other side of the heat exchanger. In most commercial and domestic grey-water systems, the grey-water flow, which is the source of the transferred heat energy, and the incoming cold mains water flow, which is the target of the transferred heat energy, are intermittent as sinks and baths are filled and emptied, and consequently hot water can be used with little or no outgoing hot grey-water.

Furthermore, with conventional surface area heat exchange technology, the coldest the outgoing grey-water can be cooled down to is to within a degree or so of the incoming mains water to the building. As the temperature of the incoming mains water increases, during the summer months for example, the heat recovery potential of a conventional grey-water heat recovery apparatus reduces to a point where heat transfer is particularly limited or even stops and thus prior equipment does not provide an economically viable solution.

BRIEF SUMMARY

It is an aim of the present invention to at least partly mitigate the above-mentioned problems.

It is an aim of certain embodiments of the present invention to provide apparatus and a method for efficiently transferring heat energy from a waste-liquid, such as domestic or commercial grey/black-water or rainwater or a combination of these waste-liquids, in a variety of climatic and geographical conditions.

It is an aim of certain embodiments of the present invention to provide apparatus and a method for transferring heat energy from a waste-liquid which flows continuously or discontinuously.

It is an aim of certain embodiments of the present invention to provide apparatus and a method for transferring heat energy from a waste-liquid, and which is automatically adaptable based on at least a temperature of the waste-liquid, to ensure optimal heat recovery from the waste-liquid is achieved.

According to a first aspect of the invention there is provided apparatus for transferring heat energy from a waste-liquid, comprising:

at least one heat exchange element for transferring heat energy from waste-liquid in a first container to a first target fluid;

at least one heat pump element for transferring heat energy from waste-liquid transferred from the first container to the further container;

at least one selectively operable exit-valve element for selectively providing at least one fluid communication path for allowing waste-liquid to exit from the further container; and at least one controller element for selectively operating the heat pump element to transfer heat energy from waste-liquid in the further container to a further target fluid and/or for selectively operating the at least one selectively operable exit-valve element.

Aptly, the apparatus further comprises at least one further fluid communication path for transferring waste-liquid from the first container to the further container.

Aptly, the at least one heat exchange element is located so as to allow transfer of heat energy from waste-liquid within the first container to a first target fluid.

Aptly, the at least one heat exchange element is located in the first container.

Aptly, the at least one heat pump element is located so as to allow transfer of heat energy from waste-liquid in the further container to the further target fluid.

Aptly, the at least one heat pump element is located in the further container.

Aptly, the at least one heat exchange element is located in the first container and the at least one heat pump element is located in the further container.

Aptly, the apparatus further comprises at least one selectively operable cut-off valve element for selectively providing or preventing fluid communication between the first container and the further container.

Aptly, the first container comprises at least one fluid receiving inlet for receiving waste-liquid.

Aptly, the apparatus further comprises at least one baffle element each located in a respective one of the first and/or further container for improving at least one or more of, retention time of waste-liquid, heat energy transfer from waste-liquid and/or flow of waste-liquid in the first and/or further containers.

Aptly, the apparatus further comprises at least one baffle element located in the first container.

Aptly, the apparatus further comprises at least one baffle element located in the further container.

Aptly, the apparatus further comprises at least one baffle element located in the first container and at least one baffle element located in the further container.

Aptly, the at least one baffle element is for improving retention time of waste-liquid in the first container.

Aptly, the at least one baffle element is for improving heat energy transfer from waste-liquid in the first container.

Aptly, the at least one baffle element is for improving flow of waste-liquid in the first container.

Aptly, the at least one baffle element is for improving retention time of waste-liquid in the further container.

Aptly, the at least one baffle element is for improving heat energy transfer from waste-liquid in the further container.

Aptly, the at least one baffle element is for improving flow of waste-liquid in the further container.

Aptly, the first container has a volume equal to or greater than the volume of the further container. As defined herein the volume of a container is the total volume of the interior of a container that is capable of holding a fluid without allowing flow of the fluid from the container with operation of at least one valve element to prevent flow of fluid from the container.

Aptly, the first container comprises at least one first overflow outlet.

Aptly, the further container comprises at least one overflow inlet.

Aptly, the at least one first overflow outlet is connected to the at least one first overflow inlet by at least one first overflow pipe for allowing waste-liquid to transfer from the first container to the further container.

Aptly the further container comprises at least one further overflow outlet.

Aptly, the at least one further overflow outlet is connected to at least one further overflow pipe for allowing waste-liquid to exit the further container.

Aptly, the apparatus further comprises at least one parameter sensor to provide the at least one controller element with at least one corresponding signal.

Aptly, the at least one parameter sensor comprises at least one temperature sensor.

Aptly, the at least one parameter sensor comprises at least one volume sensor.

Aptly, the at least one volume sensor comprises at least one liquid level sensor.

Aptly, the at least one parameter sensor comprises one or more of at least one temperature sensor and/or at least one volume sensor wherein optionally the volume sensor is at least one liquid level sensor.

Aptly, the corresponding signal comprises temperature of waste-liquid in the first container and/or further container.

Aptly, the corresponding signal comprises volume of waste-liquid in the first container and/or further container.

Aptly, the corresponding signal comprises liquid level of waste-liquid in the first container and/or further container. As used herein the term "level" of waste liquid refers to the approximate location of the upper surface of a liquid in a container.

Aptly, the at least one selectively operable exit-valve element and/or the at last one selectively operable cut-off valve element are selectively operated by the at least one controller element.

Aptly, the at least one selectively operable exit-valve element and/or the at last one selectively operable cut-off valve element are selectively operated by the at least one controller element in response to at least one temperature of waste-liquid in the first container and/or further container.

Aptly, the at least one selectively operable exit-valve element and/or the at last one selectively operable cut-off valve element are selectively operated by the at least one controller element in response to at least one volume of waste-liquid in the first container and/or further container.

Aptly, the at least one selectively operable exit-valve element and/or the at last one selectively operable cut-off valve element are selectively operated by the at least one controller element in response to at least one level of waste-liquid in the first container and/or further container.

Aptly, the least one selectively operable exit-valve element is selectively operated by the at least one controller element when the temperature of waste-liquid in the further container is equal to or less than a predetermined low threshold temperature to allow exit of waste-liquid from the further container.

Aptly, the predetermined low threshold temperature is in a range of about around 1° C. to about around 15° C., i.e. is equal to or less than 1° C., 2° C., 3° C., 4° C., 5° C., 6° C., 7° C., 8° C., 9° C., 10° C., 11° C., 12° C., 13° C., 14° C., 15° C.

Aptly, the range is about around 3° C. to about around 10° C., i.e. is equal to or less than 3° C., 4° C., 5° C., 6° C., 7° C., 8° C., 9° C., 10° C.

Aptly, the least one selectively operable exit-valve element is selectively operated by the at least one controller element when the temperature of waste-liquid in the further container is equal to or greater than a predetermined high threshold temperature to prevent exit of waste-liquid from the further container.

Aptly, the predetermined high threshold temperature is in a range of about around 1° C. to about around 80° C., i.e. is equal to or greater than 1° C., 2° C. 3° C., 4° C., 5° C., 6° C., 7° C., 8° C., 9° C., 10° C., 11° C., 12° C., 13° C., 14° C., 15° C., 20° C., 30° C., 40° C., 50° C., 60° C., 70° C., 80° C.

Aptly, the range is about around 3° C. to about around 15° C., i.e. is equal to or greater than 1° C., 2° C. 3° C., 4° C., 5° C., 6° C., 7° C., 8° C., 9° C., 10° C., 11° C., 12° C., 13° C., 14° C., 15° C.

Aptly, the at least one selectively operable exit-valve element is selectively operated by the at least one controller element when the volume of waste-liquid in the further container is equal to or less than a predetermined low threshold volume to prevent exit of waste-liquid from the further container.

Aptly, the predetermined low threshold volume is in a range of about around 99% to about around 1% of the volume of the further container, i.e. is equal to or less than 99%, 98%, 97%, 96%, 95%, 90%, 80%, 70%, 60%, 50%, 40%, 3%, 20%, 10%, 5%, 1%.

Aptly, the at least one selectively operable exit-valve element is selectively operated by the at least one controller element when the level of waste-liquid in the further container is equal to or less than a predetermined low threshold level to prevent exit of waste-liquid from the further container.

Aptly, the predetermined low threshold level is in a range of about around 99% to about around 1% of the level of waste liquid in the further container, i.e. is equal to or less than 99%, 98%, 97%, 96%, 95%, 90%, 80%, 70%, 60%, 50%, 40%, 30%, 20%, 10%, 5%, 1%.

Aptly, the at least one selectively operable exit-valve element is selectively operated by the at least one controller element when the volume of waste-liquid in the further container is equal to or greater than a predetermined high threshold volume to allow exit of waste-liquid from the further container.

Aptly, the predetermined high threshold volume is in a range of about around 100% to about around 1% of the volume of the further container, i.e. is equal to or greater than 100%, 99%, 98%, 97%, 96%, 95%, 90%, 80%, 70%, 60%, 50%, 40%, 30%, 20%, 10%, 5%, 1%.

Aptly, the at least one selectively operable exit-valve element is selectively operated by the at least one controller element when the level of waste-liquid in the further container is equal to or greater than a predetermined high threshold level to allow exit of waste-liquid from the further container.

Aptly, the predetermined high threshold level is in a range of about around 100% to about around 1% of the level of waste liquid in the further container, i.e. is equal to or greater than 100%, 99%, 98%, 97%, 96%, 95%, 90%, 80%, 70%, 60%, 50%, 40%, 30%, 20%, 10%, 5%, 1%.

Aptly, the at least one selectively operable cut-off valve element is selectively operated by the at least one controller element when the volume of waste-liquid in the further container is equal to or greater than the predetermined high threshold volume to prevent fluid communication between the first container and further container.

Aptly, the at least one selectively operable cut-off valve element is selectively operated by the at least one controller element when the level of waste-liquid in the further container is equal to or greater than the predetermined high threshold level to prevent fluid communication between the first container and further container.

Aptly, the at least one selectively operable cut-off valve element is selectively operated by the at least one controller element when the volume of waste-liquid in the further container is equal to or less than the predetermined low threshold volume to provide fluid communication between the first and further container.

Aptly, the at least one selectively operable cut-off valve element is selectively operated by the at least one controller element when the level of waste-liquid in the further container is equal to or less than the predetermined low threshold level to provide fluid communication between the first and further container.

Aptly, the further target fluid is located within the at least one heat pump element.

Aptly, the further target fluid comprises a refrigerant.

Aptly, the refrigerant comprises carbon dioxide.

Aptly, heat energy is transferred from the at least one heat pump element to at least one heat sink via the refrigerant.

Aptly, the at least one heat pump element comprises at least one evaporator member, at least one condenser member and/or at least one compressor member.

Aptly, the at least one compressor member is for moving the further target fluid through the at least one heat pump element.

Aptly, the at least one controller element operates the at least one heat pump element to not transfer heat energy from waste-liquid in the further container when the temperature of waste-liquid in the further container is equal to or less than the predetermined low threshold temperature.

Aptly, the at least one controller element operates the at least one heat pump element to transfer heat energy from waste-liquid in the further container when the temperature of waste-liquid in the further container is equal to or greater than the predetermined high threshold temperature.

Aptly, the at least one controller element operates the at least one heat pump element to transfer heat energy from waste-liquid in the further container when the volume of waste-liquid in the further container is equal to or greater than the predetermined high threshold volume.

Aptly, the at least one controller element operates the at least one heat pump element to transfer heat energy from waste-liquid in the further container when the level of waste-liquid in the further container is equal to or greater than the predetermined high threshold level.

Aptly, the at least one controller element operates the at least one heat pump element to not transfer heat energy from waste-liquid in the further container when the volume of waste-liquid in the further container is equal to or less than the predetermined low threshold volume.

Aptly, the at least one controller element operates the at least one heat pump element to not transfer heat energy from waste-liquid in the further container when the level of waste-liquid in the further container is equal to or less than the predetermined low threshold level.

Aptly, the at least one heat sink is selected from one or more of a domestic or commercial hot water cylinder, a swimming pool and/or a domestic or commercial heating system.

Aptly, the first target fluid is at a temperature in the range of about around 1° C. to 80° C.

Aptly, the first target fluid is at a temperature in the range of about around 1° C. to 30° C.

Aptly, the first target fluid comprises water.

Aptly, the first target fluid comprises a water supply for a water heater.

Aptly, the first target fluid comprises mains water.

Aptly, the first target fluid comprises domestic hot water.

Aptly, the waste-liquid comprises commercial and/or domestic grey-water.

Aptly, the waste-liquid comprises commercial and/or domestic black-water.

Aptly, the waste-liquid comprises rainwater.

Aptly, the rainwater comprises collected rainwater.

Aptly, the waste-liquid comprises a combination of at least two of commercial and/or domestic grey-water, commercial and/or domestic black-water and/or rainwater.

Aptly, the waste-liquid is at a temperature in the range of about around 1° C. to about around 90° C.

Aptly, the waste-liquid is at a temperature in the range of about around 30° C. to about around 50° C.

Aptly, the apparatus further comprises at least one additional fluid communication path for allowing waste-liquid to exit from the further container.

Aptly, the apparatus further comprises at least one additional selectively operable exit-valve element for selectively allowing or preventing the exit of waste-liquid from the further container via the at least one additional fluid communication path.

Aptly, at least one additional selectively operable exit-valve element is operated by the at least one controller element.

Aptly, waste-liquid exits from the further container into at least one or more of a sewer, a liquid recycling unit and/or a Heating, ventilation and Air Conditioning (HVAC) unit.

According to a second aspect of the invention there is provided a method for transferring heat energy from a waste-liquid, comprising:
 receiving waste-liquid in a first container;
 transferring heat energy from waste-liquid in the first container to a first target fluid located in an at least one heat exchange element;
 transferring waste-liquid from the first container to a further container;
 selectively operating at least one heat pump element to transfer heat energy from waste-liquid in the further container to a further target fluid; and
 selectively operating at least one selectively operable exit-valve element for respectively allowing or preventing waste-liquid to exit from the further container.

Aptly, operation of the at least one heat pump element and/or the at least one selectively operable exit-valve element are selected in response to at least one sensed parameter of waste-liquid in the first and/or further container.

Aptly, the method further comprises operating at least one selectively operable cut-off valve element located for selectively allowing or preventing fluid communication between the first container and the further container.

Aptly, operation of the at least one selectively operable cut-off valve is selected in response to at least one sensed parameter of waste-liquid in the first and/or further container.

Aptly, operation of the at least one heat pump element and/or the at least one selectively operable exit-valve element and/or the at least one cut-off valve element is by at least one controller element.

Aptly, operation of the at least one selectively operable exit-valve element to allow exit of waste-liquid from the further container is in response to a temperature of waste-liquid in the further container equal to or less than a predetermined low threshold temperature.

Aptly, the predetermined low threshold temperature is in a range of about around 1° C. to about around 15° C., i.e. is equal to or less than 1° C., 2° C. 3° C., 4° C., 5° C., 6° C., 7° C., 8° C., 9° C., 10° C., 11° C., 12° C., 13° C., 14° C., 15° C.

Aptly, the range is about around 3° C. to about around 10° C., i.e. is equal to or less than 3° C., 4° C., 5° C., 6° C., 7° C., 8° C., 9° C., 10° C.

Aptly, operation of the at least one selectively operable exit-valve element to prevent exit of waste-liquid from the further container is in response to a temperature of waste-liquid in the further container equal to or greater than a predetermined high threshold temperature.

Aptly, the predetermined high threshold temperature is in a range of about around 1° C. to about around 80° C., i.e. is equal to or greater than 1° C., 2° C. 3° C., 4° C., 5° C., 6° C., 7° C., 8° C., 9° C., 10° C., 11° C., 12° C., 13° C., 14° C., 15° C., 20° C., 30° C., 40° C., 50° C., 60° C., 70° C., 80° C.

Aptly, the range is about around 3° C. to about around 15° C., i.e. is equal to or greater than 1° C., 2° C. 3° C., 4° C., 5° C., 6° C., 7° C., 8° C., 9° C., 10° C., 11° C., 12° C., 13° C., 14° C., 15° C.

Aptly, operation of the at least one selectively operable exit-valve element to allow exit of waste-liquid from the further container is in response to a volume of waste-liquid in the further container equal to or greater than a predetermined high threshold volume.

Aptly, the predetermined high threshold volume is in a range of about around 100% to about around 1% of the volume of the further container, i.e. is equal to or greater than 100%, 99%, 98%, 97%, 96%, 95%, 90%, 80%, 70%, 60%, 50%, 40%, 30%, 20%, 10%, 5%, 1%.

Aptly, operation of the at least one selectively operable exit-valve element to allow exit of waste-liquid from the further container is in response to a level of waste-liquid in the further container equal to or greater than a predetermined high threshold level.

Aptly, operation of the at least one selectively operable exit-valve element to prevent exit of waste-liquid from the further container is in response to a volume of waste-liquid in the further container equal to or less than a predetermined low threshold volume.

Aptly, the predetermined low threshold volume is in a range of about around 99% to about around 1% of the volume of the further container, i.e. is equal to or less than 99%, 98%, 97%, 96%, 95%, 90%, 80%, 70%, 60%, 50%, 40%, 30%, 20%, 10%, 5%, 1%.

Aptly, operation of the at least one selectively operable exit-valve element to prevent exit of waste-liquid from the further container is in response to a level of waste-liquid in the further container equal to or less than a predetermined low threshold level.

Aptly, operation of the at least one heat pump element to transfer heat energy from waste-liquid in the further container is in response to a temperature of waste-liquid in the further container equal to or greater than the predetermined high threshold temperature.

Aptly, operation of the at least one heat pump element to not transfer heat energy from waste-liquid in the further container is in response to a temperature of waste-liquid in the further container equal to or less than the predetermined low threshold temperature.

Aptly, operation of the at least one heat pump element to not transfer heat energy from waste-liquid in the further container is in response to a volume of waste-liquid in the further container equal to or less than the predetermined low threshold volume.

Aptly, operation of the at least one heat pump element to not transfer heat energy from waste-liquid in the further container is in response to a level of waste-liquid in the further container equal to or less than the predetermined low threshold level.

Aptly, operation of the at least one heat pump element to transfer heat energy from waste-liquid in the further container is in response to a volume of waste-liquid in the further container equal to or greater than the predetermined low threshold volume.

Aptly, operation of the at least one heat pump element to transfer heat energy from waste-liquid in the further container is in response to a level of waste-liquid in the further container equal to or greater than the predetermined low threshold level.

Aptly, operation of the at least one selectively operable cut-off valve element to allow transfer of waste-liquid from the first container to the further container in response to a volume of waste-liquid in the further container equal to or less than the predetermined low threshold volume.

Aptly, operation of the at least one selectively operable cut-off valve element to allow transfer of waste-liquid from the first container to the further container in response to a level of waste-liquid in the further container equal to or less than the predetermined low threshold level.

Aptly, operation of the at least one selectively operable cut-off valve element to prevent transfer of waste-liquid from the first container to the further container in response to a volume of waste-liquid in the further container equal to or greater than the predetermined high threshold volume.

Aptly, operation of the at least one selectively operable cut-off valve element to prevent transfer of waste-liquid from the first container to the further container in response to a level of waste-liquid in the further container equal to or greater than the predetermined high threshold level.

Aptly, the method further comprises reusing and/or recycling waste-liquid that exits from the further container.

According to a third aspect of the present invention there is provided apparatus constructed and arranged substantially as described herein with reference to the accompanying drawings.

According to a fourth aspect of the present invention there is provided a method substantially as described herein with reference to the accompanying drawings.

BRIEF DESCRIPTION OF THE FIGURES

Certain embodiments of the present invention will now be described hereinafter, by way of example only, with reference to the accompanying drawings in which.

DETAILED DESCRIPTION OF VARIOUS EMBODIMENTS

Figure 1:
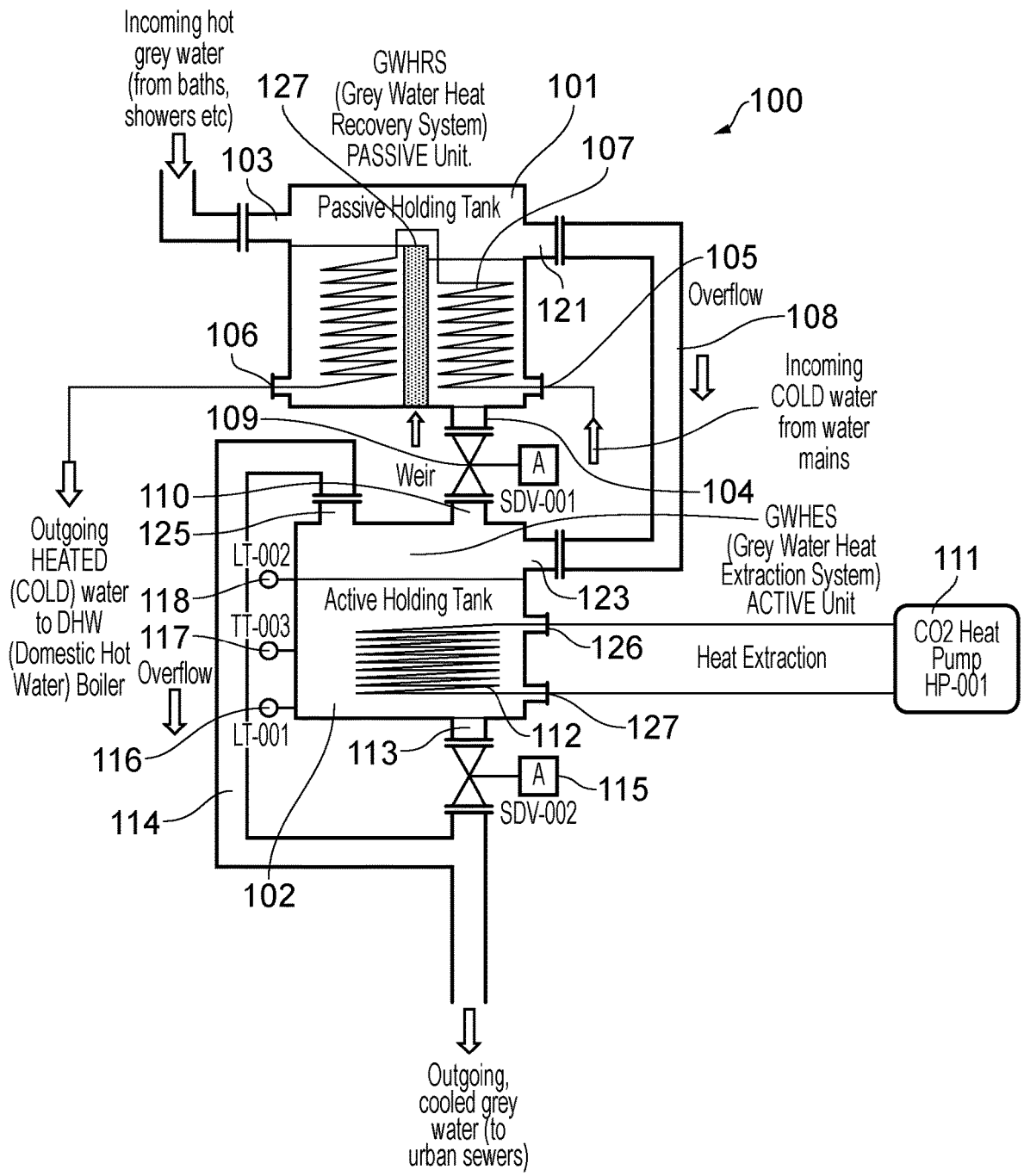
FIG. 1 illustrates apparatus for transfer of heat energy from waste-liquid in accordance with certain embodiments of the present invention.

In the drawings like reference numerals refer to like parts.

FIG. 1 provides a schematic diagram illustrating apparatus 100 for transferring heat energy from waste-liquid. According to certain embodiments of the present invention, heat energy is recovered/transferred from domestic grey-water to heat an incoming first target fluid, such as domestic water from a mains water supply and/or a heat sink, such as a DHW cylinder, swimming pool, heated floor, or the like via a further target fluid such as a refrigerant or the like. Mains water supply refers to water to be heated for use in a domestic or commercial hot water system and/or a commercial or domestic heating system and may be known in the art as domestic hot water. It will be appreciated that certain embodiments of the present invention can be applied to a range of domestic and commercial applications including hotels, offices, industrial units, manufacturing plants, or the like, as well as anywhere there is a desire to recover heat energy from a waste-liquid. The waste-liquid and/or the target fluid or fluids (e.g. mains water supply (domestic hot water), a refrigerant and/or heat sink) are not limited to water or a refrigerant, and may consist partly or wholly of any other suitable fluid or combination of suitable fluids. For example, the waste-liquid may be an industrial waste chemical which has been heated during a chemical process, or may be waste cooling fluid which has been heated during a machining process, or the like. In cases where fluids other than water are used, it will be understood that differences in their physical properties such as freezing temperature should be taken into account in accordance with certain embodiments of the present invention. Where temperatures and pressures are provided herein, it will be understood that they are examples only, and are not intended to limit the scope of the invention. For example, commercial or industrial embodiments may use fluids at higher or lower temperatures and/or pressures than domestic waste-liquids and, as will be understood, a suitable temperature gradient between two liquids may be required for heat transfer to take place from one fluid to another fluid in accordance with certain embodiments of the present invention.

The apparatus 100 includes a first container 101 and a further container 102. The first container 101 and the further container 102 will hereinafter be referred to as the passive holding tank 101 and the active holding tank 102 respectively.

In the embodiment shown in FIG. 1 the passive holding tank 101 includes a fluid receiving inlet (referred to as the passive inlet) 103 that is connected to a source of waste-liquid. For the purposes of the illustrated example, waste-liquid is the grey-water of a domestic building and may include water and/or other liquids discharged from baths, showers, sinks, dishwashers, washing machines, and the like. The waste-liquid may also in certain embodiments be or contain domestic black-water discharged from toilets, for example. In certain embodiments the source of waste-liquid may be rainwater which has been collected in a rainwater harvest tank. In certain embodiments the waste-liquid may be a combination of rainwater and commercial or domestic black or grey water. The temperature of the grey-water may typically be above ambient conditions and, in the case of domestic grey-water, it may be approximately 30-50° C.

In the embodiment shown in FIG. 1 the passive holding tank 101 includes a fluid outlet (referred to as the passive outlet) 104 that is connected to a fluid inlet (referred to as the active inlet) 110 of the active holding tank 102 which in combination with suitable piping or other suitable mechanism may provide fluid communication between the passive holding tank 101 and the active holding tank 102. A selectively operable cut-off valve element 109 is located for providing or preventing fluid communication between the passive holding tank 101 and the active holding 102 via the passive outlet 104 and the active inlet 110. The cut-off valve element 109 may be a conventional flap or ball valve, or the like, which may be actuated to provide or prevent fluid communication from the passive holding tank 101 to the active holding tank 102 via the passive outlet 104 and the active inlet 110, by a solenoid or electric motor, for example, other suitable valves and operation methods will be known by those skilled in the art. The passive outlet 104 may be located at or near to the bottom of the passive holding tank 101 and/or at or near the bottom of one of the vertical surface of the passive holding tank 101 so that grey-water can flow out of the passive holding tank 101 and into the active holding tank 102 via the cut-off valve element 109 under the influence of gravity only. The passive holding tank 101 may also include a first overflow outlet 121 connected to an overflow inlet 123 of the active holding tank 102 by a first overflow pipe 108. The first overflow outlet 121 may be located at or near the top of the passive holding tank 101 and/or at or near the top of one of the vertical surfaces of the passive holding tank 101 so as to allow the flow of waste-liquid from a portion of the passive holding tank 101 to the active holding tank 102 when the volume of grey-water in the passive holding tank exceeds the volume of the interior of the passive holding tank 101 able to hold grey-water. This may help ensure that heat energy not transferred to the first target fluid of the heat exchange element is subsequently transferred to the further target fluid of the heat pump element and so therefore useful heat energy may not be wasted.

In certain embodiments a heat exchange element may be a heat exchanger. In the embodiment shown in FIG. 1 the passive holding tank 101 contains tubing 107 that is at least part of a heat exchanger wherein the tubing 107 is suitable for containing a first target fluid (i.e. mains water) to which heat is to be transferred. In certain embodiments the tubing 107 is at least part of a shell and tube design heat exchanger, other suitable heat exchangers and designs will be known by those skilled in the art. In certain embodiments the passive holding tank 101 may include a heat exchanger inlet 105 and a heat exchanger outlet 106 for providing a path where the tubing 107 may enter and exit the passive holding tank 102 respectively. In certain embodiments the heat exchanger inlet 105 and the heat exchanger outlet 106 are fluid tight, that is to say the heat exchanger inlet 105 and the heat exchanger outlet 106 do not allow flow of grey-water from passive holding tank 101 via the heat exchanger inlet 105 and/or the heat exchanger outlet 106. In certain embodiments the tubing 107 is not located within the passive holding 101 and so a heat exchanger inlet 105 and heat exchanger outlet 106 are not required, by way of example the tubing 107 may be located on or around an outside surface of the passive holding tank 101, other suitable arrangements will be appreciated by those skilled in the art. It will be understood by those skilled in the art that the tubing 107 should be located so that heat energy can pass from grey-water in the passive holding tank 101 to the first target fluid, without the input of energy and in a location that helps maximise the amount of heat energy transferred i.e. by passive heat transfer.

In certain embodiments the design of the passive holding tank 101 is selected to provide a volume for holding grey-water which may help negate any adverse effects due to degradation of surfaces of the tubing 107 or other heat exchanger surfaces, that may occur. That is to say that in certain embodiments the larger the volume of grey-water held in the passive holding tank 101, the longer the grey-water stays within the passive holding tank 101, and in turn, the greater the opportunity for heat to be transferred from the grey-water to the first target fluid.

The passive holding tank 101 may include at least one internal baffle element. In certain embodiments the baffle element is a weir 127, other suitable baffle elements will be known to those skilled in the art. In certain embodiments the weir 127 may encourage the movement of grey-water in or through the passive holding tank 101 and around the tubing 107 to improve heat transfer from the grey-water to the first target fluid (mains water) flowing therethrough. In certain embodiments the weir 127 may additionally or alternatively help improve liquid retention in the passive holding tank 101 and in turn help optimise recovery of heat energy from the grey-water in the passive holding tank 101.

In the embodiment shown in FIG. 1 the active holding tank 102 includes a selectively operable exit-valve element 115 that is suitable for providing or preventing a fluid communication path which may be an exit-path 113 to allow grey-water to exit the active holding tank 102. The exit-valve element 115 may be a conventional flap or ball valve, or the like, which may be actuated to provide or prevent fluid communication via the exit-path 113 by a solenoid or electric motor, for example, other suitable valves and operation methods will be known by those skilled in the art. In certain embodiments the exit-valve element 115 and the exit-path 113 may be located at or near the bottom of the active holding tank 102 to allow grey-water to flow from the active holding tank 102 under the influence of gravity only. Additionally or alternatively, in certain embodiments the active holding tank 102 may include an additional fluid communication path (not shown) for allowing exit of grey-water from the active holding tank 102. In certain embodiments grey-water that exits the active holding tank 102 may be re-used or recycled for toilets, irrigation or the like or may be exited into a sewer network.

In certain embodiments the active holding tank 102 may also include a further overflow outlet 125 connected to a further overflow pipe 114 for allowing exit of grey-water from the top of the active holding tank 102. In certain embodiments the further overflow outlet 125 may be located at or near the top of the active holding tank 102 and/or at or near the top of one of the vertical surfaces of the active holding tank 102 so as to allow the exit of grey-water from the active holding tank 102 when the volume of grey-water exceeds the volume of the active holding tank 102 capable of holding grey-water.

In certain embodiments the active holding tank 102 includes at least one baffle element (not shown) to improve heat transfer. The baffle element may be weir, or the like other suitable baffle elements will be known to those skilled in the art. The baffle element may help encourage the movement of grey-water in the active holding tank 102 and/or help improve liquid retention in the active holding tank 102.

In certain embodiments the heat pump element is a heat pump 111 that uses electrical energy to power a compressor (not shown) to move a refrigerant within an evaporator coil 112 to a condenser coil (not shown) for transferring heat energy from a heat source (grey-water) to a heat sink, by way of example the heat sink may be a domestic hot water cylinder, a swimming pool, underfloor heating system, or the like, other suitable heat sinks will be known. Other suitable heat pump elements will be known to those skilled in the art. The heat pump 111 may use a refrigerant such as $CO_2$ as a further target fluid, other suitable further target fluids will be known by those skilled in the art. In certain embodiments the active holding tank 102 may include a heat pump inlet 126 and a heat pump outlet 127. The heat pump inlet 126 is for providing a path for the evaporator coil 112 to enter the active holding tank and the heat pump outlet 127 is for providing a path for the evaporator coil 112 to exit the active holding tank 102. Both the heat pump inlet 126 and the heat pump outlet 127 should be fluid tight. That is to say they do not allow the exit of grey-water from the active holding tank 102 via the heat pump inlet 126 and/or the heat pump outlet 127. In certain embodiments the evaporator coil 112 may be located outside the active holding 102 and so the heat pump inlet 126 and heat pump outlet 127 may not be required. By way of example the evaporator coil 112 may be located in or on an exterior surface of the active holding tank 102. It will be understood by those skilled in the art that the evaporator coil 112 may be located in a location that helps maximise the amount of heat energy extracted from the grey-water in the active holding tank 102. The heat pump 111 by way of example may have a coefficient of performance of between about around 2 and about around 6, meaning that for every 1 kW of electrical energy the heat pump 111 requires it can transfer about around 2-6 kW of heat energy.

In certain embodiments the volume of the active holding tank 102 may be equal to, or smaller than, the passive holding tank 101 to allow the passive holding tank 101 to continue to receive grey-water when the cut-off valve element 109 is operated to prevent fluid communication between the passive holding tank 101 and the active holding tank 102 via the passive outlet 104 and the active inlet 110 (i.e. is closed). By way of example for a building having 50 bedrooms such as a hotel the passive holding tank 101 may have a volume of 7.5 $m^3$ and the active holding tank 102 may have a volume of 0.72 $m^3$. The volume and the dimension of the passive holding tank 101 and active holding tank 102 may be selected based on the volume of grey-water entering the system and/or the location and climate in which the apparatus 100 is to be used.

The apparatus 100 may also in certain embodiments include at least one parameter sensor to sense the volume and/or temperature and/or level of grey-water within at least the active holding tank 102. In the embodiment shown in FIG. 1 the active holding tank 102 contains a low liquid volume sensor 116, a high liquid volume sensor 118 and a temperature sensor 117. In certain embodiments the high and low liquid volume may optionally be sensed by a single liquid volume sensor. In certain embodiments the volume sensor may be one or more liquid level sensors that sense the level of waste-liquid in at least the active holding tank and therefore indirectly senses the volume of liquid in at least the active holding tank. Suitable liquid level sensors include but are not limited to floats, hydrostatic devices, load cells, magnetic level gauges, ultrasonic level transmitters and laser level transmitters, other suitable liquid level sensors will be known by those skilled in the art. Other suitable volume sensors and methods of sensing volume directly or indirectly will be known by those skilled in the art, for example mass sensors that detect the mass of liquid in the active or passive holding tanks may allow a volume of liquid in each tank to be determined. In certain embodiments the parameter sensor may be one or more fluid flow sensors or pressure sensors, other suitable sensors will be known by those skilled in the art.

The apparatus 100 also includes a controller element (not shown). The controller element may be at least part of an electronic controller, other suitable controllers will be known to those skilled in the art. In certain embodiments the low liquid volume sensor 116, high liquid volume sensor 118 and temperature sensor 117 provide the controller element with a corresponding signal. In certain embodiments the controller element responds to the corresponding signals to execute one of several algorithms to control the operation of the heat pump 111 and to operate the cut-off valve element 109 and the exit-valve element 115, as described further below. The volume sensor(s), which is aptly a level sensor, can provide a signal when the volume of waste liquid is equal to, greater than or less than a predetermined low or high threshold volume of liquid of in the active and/or passive holding tanks.

The apparatus 100 may also include additional parameter sensors (not shown) to monitor respective conditions at different locations within the apparatus 100. The data from these additional sensors may be recorded and used to help provide an indication of performance of the apparatus 100, such as a feedback loop and/or condition monitoring. In certain embodiments the additional sensors may be used to help determine the extent of fouling of the tubing 107 and/or evaporator coil 112 and may therefore help enable maintenance to prevent the occurrence of faults or operating errors of the apparatus 100.

The operation of certain embodiments of the apparatus 100 will now be described in more detail.

In certain embodiments waste-liquid in the form of grey-water enters the passive holding tank 101 through the passive inlet 103. The grey-water has typically been discharged from a source such as a bath, shower, sink or the like, and is at a relatively 'warm' temperature (e.g. about around 30-50° C.). The grey-water may be discharged from a source to the passive holding tank 101 continuously or intermittently depending on the source.

Referring to FIG. 1, the tubing 107 located in the passive holding tank 101 has a heat exchanger inlet 105 and a heat exchanger outlet 106 that allow the tubing 107 to enter and exit the passive holding tank 101. In certain embodiments the first target fluid within the tubing 107 may be mains water. By way of example mains water supply is typically at a pressure of about around 2-5 bar and a temperature range of about around 1-30° C. (i.e. above freezing) depending on the local air/ground temperature (i.e. ambient temperature), which is variable based on the specific climatic and geographic operating environment before it enters a DHW cylinder (not shown), where it may be heated to a desired temperature, e.g. about around 50-60° C., by a water heater, such as a boiler element or electric immersion heater. In certain embodiments the mains water in the tubing 107 is at a lower temperature than the grey-water surrounding it, which allows for heat energy to be transferred from the grey-water to the mains water. In this way, the heat exchanger pre-heats the mains water before it enters the DHW cylinder and thus may help reduce the amount of energy required to heat the mains water in the DHW cylinder to the desired temperature. Furthermore, the heat exchanger may not require any energy to effect the transfer of heat energy and thus the transfer of heat energy taking place between the grey-water and mains water within the tubing 107 is 'passive'.

Depending on the type, design, sizing and operating conditions of the heat exchange element and the passive holding tank 101, the temperature of the grey-water can be reduced to within about around 1° C. or so of the mains water. In conditions where the mains water enters at a relatively low temperature (e.g. about around 3° C. in 'cold' climates) the temperature of the grey-water can be reduced to within about around 1° C. or so of this temperature (e.g. about around 4° C.), meaning that most of the useful heat energy can be transferred from the grey-water. Reducing the temperature of the grey-water further may be undesirable in view of the risk of freezing.

However, in certain conditions where the mains water enters at a relatively high temperature (e.g. about around 20° C. or greater in 'warm' climates), the temperature of the grey-water can only be reduced to within about around 1° C. or so of this higher temperature (e.g. to about around 21° C.). This means that there is useful heat energy in the grey-water that is not being transferred by the heat exchanger. In order to recover any further heat energy from the grey-water, it is necessary to use the heat pump 111 to transfer heat energy from the grey-water.

In order to use the heat pump 111 the controller element (discussed further below) operates the exit-valve element 115 to prevent the exit of waste-liquid from the active holding tank 102 (i.e. closes the exit-valve element 115) via the exit path 113 and operates the cut-off valve element 109 to allow fluid communication between the passive holding tank 101 and the active holding tank 102 (i.e. opens the cut-off valve element) via the passive outlet 104 and the active inlet 110 therefore allowing grey-water to transfer from the passive holding tank 101 to the active holding tank 102. Once the volume of grey-water in active holding tank 102 has reached a predetermined high volume (indicated by the high liquid volume sensor 118), the controller element closes the cut-off valve element 109 therefore preventing fluid communication between the passive holding tank 101 and the active holding tank 102 via the passive outlet 104 and the active inlet 110 and activates the heat pump 111 to transfer heat energy from grey-water in the active holding tank 102 to the further target fluid (refrigerant) located in the evaporator coil 112. The evaporator coil 112 transfers heat energy from grey-water in the active holding tank 102, to a heat sink via the refrigerant. The heat sink may be the first target fluid (i.e. mains water passed through the tubing 107) or may be a swimming pool, a domestic hot water cylinder or other suitable heat sink.

The heat pump 111 continues to operate to transfer heat energy from grey-water in the active holding tank 102 to the refrigerant until the temperature of grey-water in the active holding tank 102 has been reduced to a predetermined low threshold temperature (measured by the temperature sensor 117). The predetermined low threshold temperature may be chosen in certain embodiments to be at least 1° C. above the freezing temperature of the waste-liquid. Once a low temperature signal is received or is being received by the controller element the controller element operates the heat pump 111 to not transfer heat energy from the grey-water in the active holding tank 102 (i.e. stops the heat pump 111 from operating) and operates the exit-valve element 115 to allow exit of grey-water from the active holding tank 102 via the exit path 113. Once the volume of grey-water in the active holding tank 102 has reduced (measured by the low liquid volume sensor 116), the process is optionally repeated with another batch of grey-water.

During this process, wherein the heat pump 111 is operating to transfer heat energy from grey-water in the active holding tank, grey-water entering the passive holding tank 101 via the passive inlet 103 and grey-water that is currently within the passive holding tank 101 may transfer heat energy to the mains water located in the tubing 107.

In certain conditions, such as when the mains water is at a relatively low temperature, the heat exchanger may transfer sufficient heat energy from the grey-water (i.e. reduce the temperature of the grey-water so that it is at or below the predetermined low threshold temperature) before the grey-water enters the active holding tank 102. In this situation, the controller element operates the cut-off valve element 109 to provide fluid communication between the passive holding tank 101 and the active holding 102 via the passive outlet 104 and the active inlet 110 so that the grey-water is transferred to the active holding tank 102 until the volume of grey-water in the active holding tank 102 is equal to or greater than a predetermined high threshold volume at this point the high liquid volume sensor 118 provides the controller element with a high volume signal and the controller element operates the cut-off valve element 109 to prevent fluid communication between the passive holding tank 101 and the active holding 102 via the passive outlet 104 and the active inlet 110, therefore stopping the transfer of grey-water from the passive holding tank 101 to the active holding tank 102. The temperature sensor 117 sense a temperate of the grey water in the active holding tank that is less than the predetermined threshold temperature which may be selected to be about 1° C. above the freezing temperature of the grey water. The controller element then operates the exit-valve element 115 to allow the grey-water to exit the active holding tank 102 via the exit path 113 without activating the heat pump 111.

In certain embodiments the cooled grey-water that exits the active holding tank 102 may be recycled and used by way of example for toilets, irrigating gardens, or the like.

This method of operation may allow for the heat pump 111 to be operated to transfer or not to transfer heat energy from the grey-water as and when required, for example during periods where the heat exchanger has not had been able to transfer as much useful heat energy from grey-water in the passive holding tank 101 or in conditions where the mains water within the tubing 107 is of a temperature within about 1° C. of the grey-water in the passive holding tank 101. The controller element may further help performance monitoring that can help determine appropriate maintenance intervals based on the cooled grey-water temperature and the heat pump 111 demand over time.

Transferring heat energy in this way may have several benefits. Using a heat exchange element as a first mechanism for heat recovery helps maximise the amount of heat energy being transferred 'passively' (i.e. without requiring any energy input). In relatively cold climates, this can be sufficient to transfer all of the useful heat energy from waste-liquid. Using a heat pump element as a second mechanism for heat recovery may help to maximise transfer of any remaining useful heat energy from the grey-water transferred from the passive holding tank 102. Since a typical heat pump 111 may provide several kilowatts of heat energy for every kilowatt of electrical energy it consumes, the use of a heat pump 111 may help improve the efficiency of the overall heat recovery process. This helps to reduce the effect that variations in the first and/or further target fluid temperatures have on the amount of energy that can be recovered from the grey-water and provides an apparatus 100 that can help minimise operating costs and environmental impacts and help maximise heat recovery in variable climatic and geographic conditions. The apparatus 100 may be self-regulating and may adapt to seasonal climate changes. Using a batch control algorithm may help reduce the effects that inconsistent waste-liquid and target fluid flow rates may have on heat transfer.

Certain embodiments of the apparatus 100 may help reduce or help prevent the risk of liquid cross contamination, refrigerant leakage and controller element or apparatus 100 malfunction. For example, the risk of cross contamination may be reduced in the passive holding tank 101 if the first target fluid is fed from a pressurised system as may be the case for mains water and the waste-liquid in the passive holding tank is not pressurised. Leaks in the tubing 107 would be outward from the tubing 107 into the outgoing waste-liquid, thus helping reduce the risks of contamination of the first target fluid. Furthermore, the passive holding tank 101 may be fitted with a first overflow outlet 121 and a first overflow pipe 108 that routes water directly into the active holding tank 102 via the first over flow outlet 121 and overflow inlet 123 in the event of valve or controller malfunction and/or the volume of liquid in the passive holding tank 101 exceeds a certain volume that may be predetermined.

In the active holding tank 102, the risk of cross contamination between the first target fluid and the further target fluid may be reduced in certain embodiments where a refrigerant (further target fluid) within the evaporator coil 112 is used to transfer heat energy from the waste-liquid, so there may be no contact between the first target fluid and the further target fluid. In certain embodiments the active holding tank 102 may be fitted with a further overflow outlet 125 and a further overflow pipe 114 that routes waste-liquid from a portion of the active holding tank 102 to exit the active holding tank 102 via the further overflow outlet 125 in the event of valve or controller element malfunction and/or the volume of liquid in the active holding tank 102 exceeds a certain volume that may be predetermined.

As the heat pump 111 may operate at high pressure, there may be a small risk of further target fluid leaking out into the active holding tank 102 and/or the heat sink. Although the active holding tank 102 in certain embodiments may be inherently safe from over pressurisation since it may be vented, the heat sink (i.e. a DHW cylinder) may optionally be provided with over-pressure protection in the form of a pressure safety valve.

According to certain other further embodiments of the present invention further applications of the present invention are envisaged. There may be the potential to use the cooled outgoing waste-liquid as an air pre-cooler for HVAC (heating, ventilation and air conditioning) units to reduce air conditioning unit loads and hence reduce HVAC unit energy demands.

It is also possible that certain embodiments of the present invention may be connected to a liquid recycling unit which may utilise the discharged, cooled waste-liquid that exits from the active holding tank 102 for irrigation or re-use in toilets and other suitable applications.

These features may be useful if there were any objections, from local council authorities for example, to discharging cold grey-water into the sewer network.

There may also be the potential that in certain embodiments the heat pump element may be a single refrigeration/heat pump system such that a single refrigerant cycle could be operated to cool down food products in cold boxes, extract heat from grey-water and use this extracted heat to directly heat water in the DHW cylinder and/or provide low grade energy to heat sinks such as swimming pools and spa pools.

The operation of the controller element will now be described in more detail with reference to FIGS. 1 to 5.

Throughout the FIGS. 2 to 5, the following notation is used: SDV-001 refers to the cut-valve element 109. SDV-002 refers to the exit-valve element 115. HP-001 refers to the heat pump 111. LAL-001 refers to the low liquid volume sensor 116. LAH-001 refers to the high liquid volume sensor 118. TAL-003 refers to a low temperature signal from the temperature sensor 117. TAH-003 refers to a high temperature signal from the temperature sensor 117.

Figure 2:
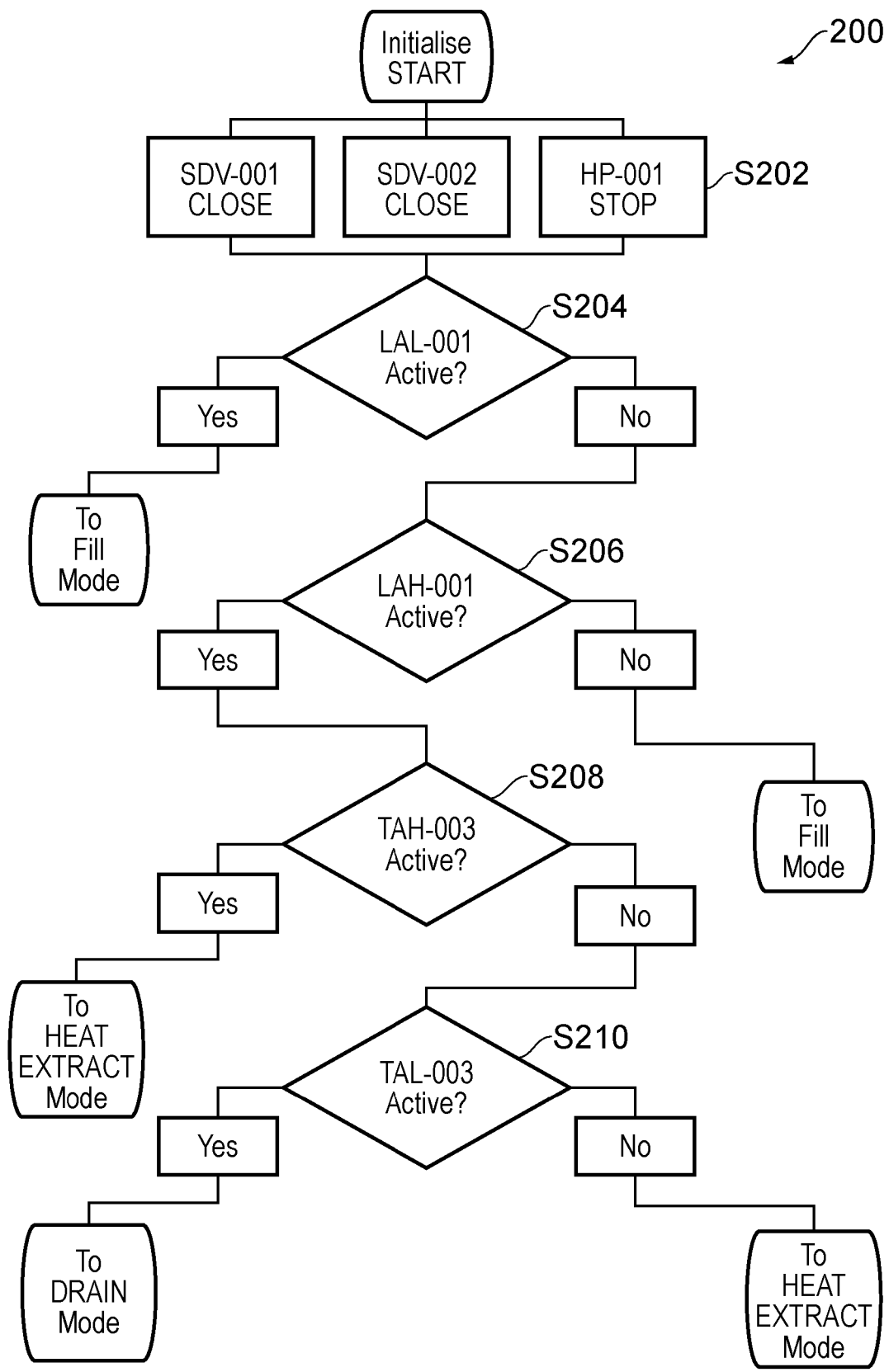
FIG. 2 provides a flow chart showing an initialisation mode algorithm executed by the controller element of the apparatus in accordance with certain embodiments of the present invention.

FIG. 2 provides a flow chart showing an initialisation mode algorithm 200 that is executable by the controller element. The initialise mode algorithm 200 is the starting point for a sequence of algorithms executed by the controller element. When the apparatus 100 is operated for the first time, the initialise mode algorithm 200 may executed by the controller element.

Figure 3:
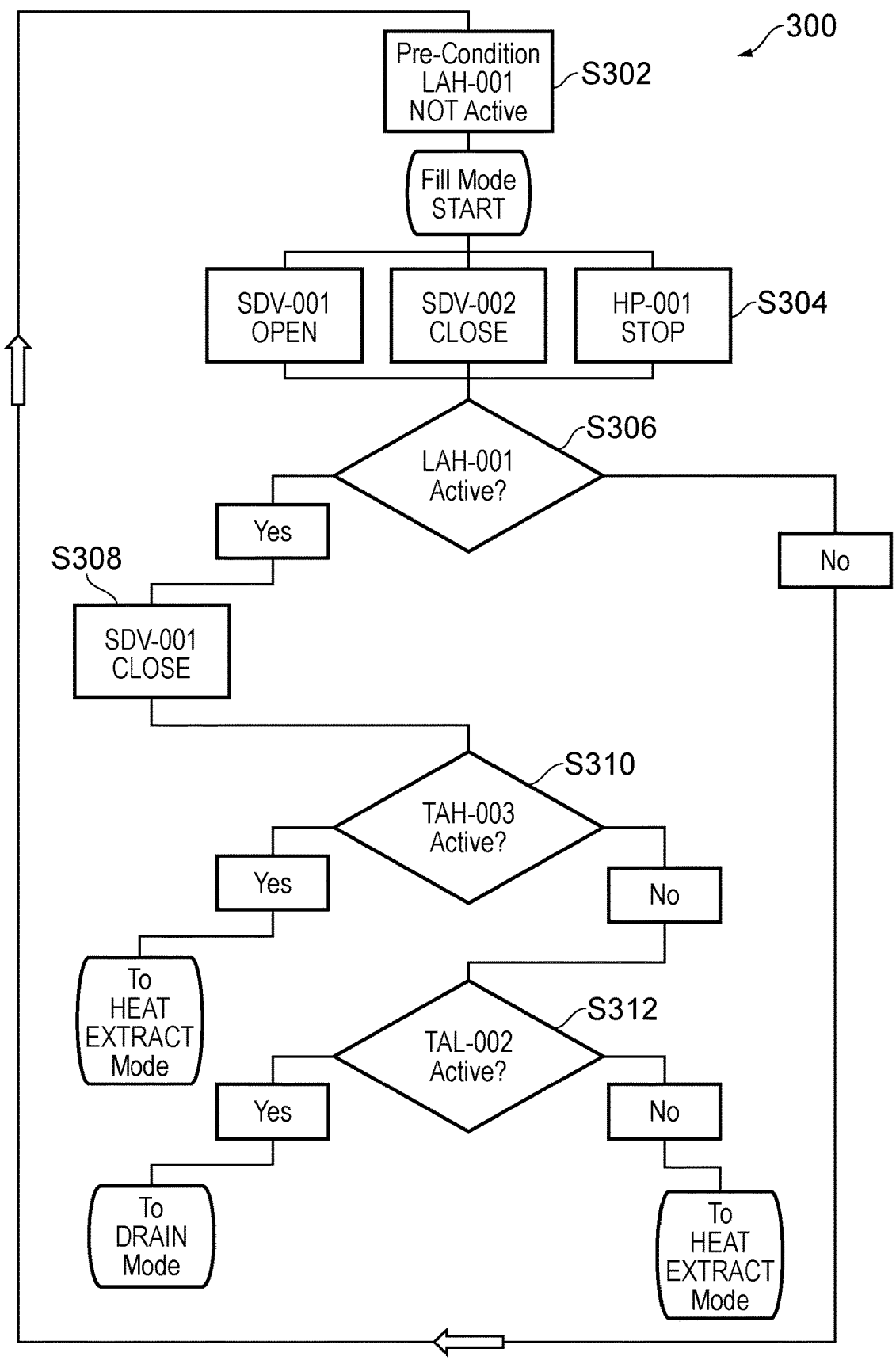
FIG. 3 provides a flow chart showing a fill mode algorithm executed by the controller element of the apparatus accordance with certain embodiments of the present invention.
Figure 4:
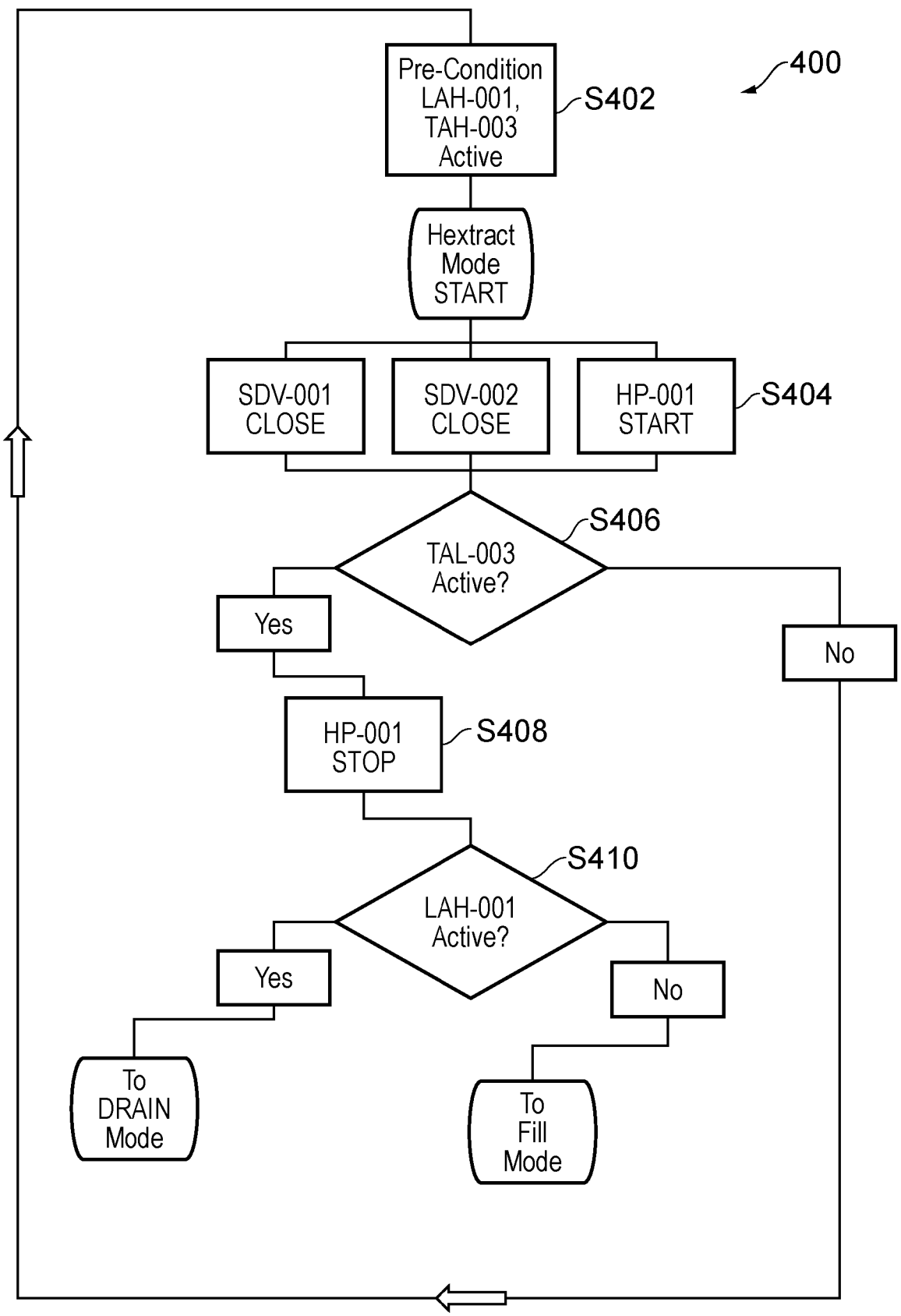
FIG. 4 provides a flow chart showing a heat extraction mode algorithm executed by the controller element of the apparatus in accordance with certain embodiments of the present invention.
Figure 5:
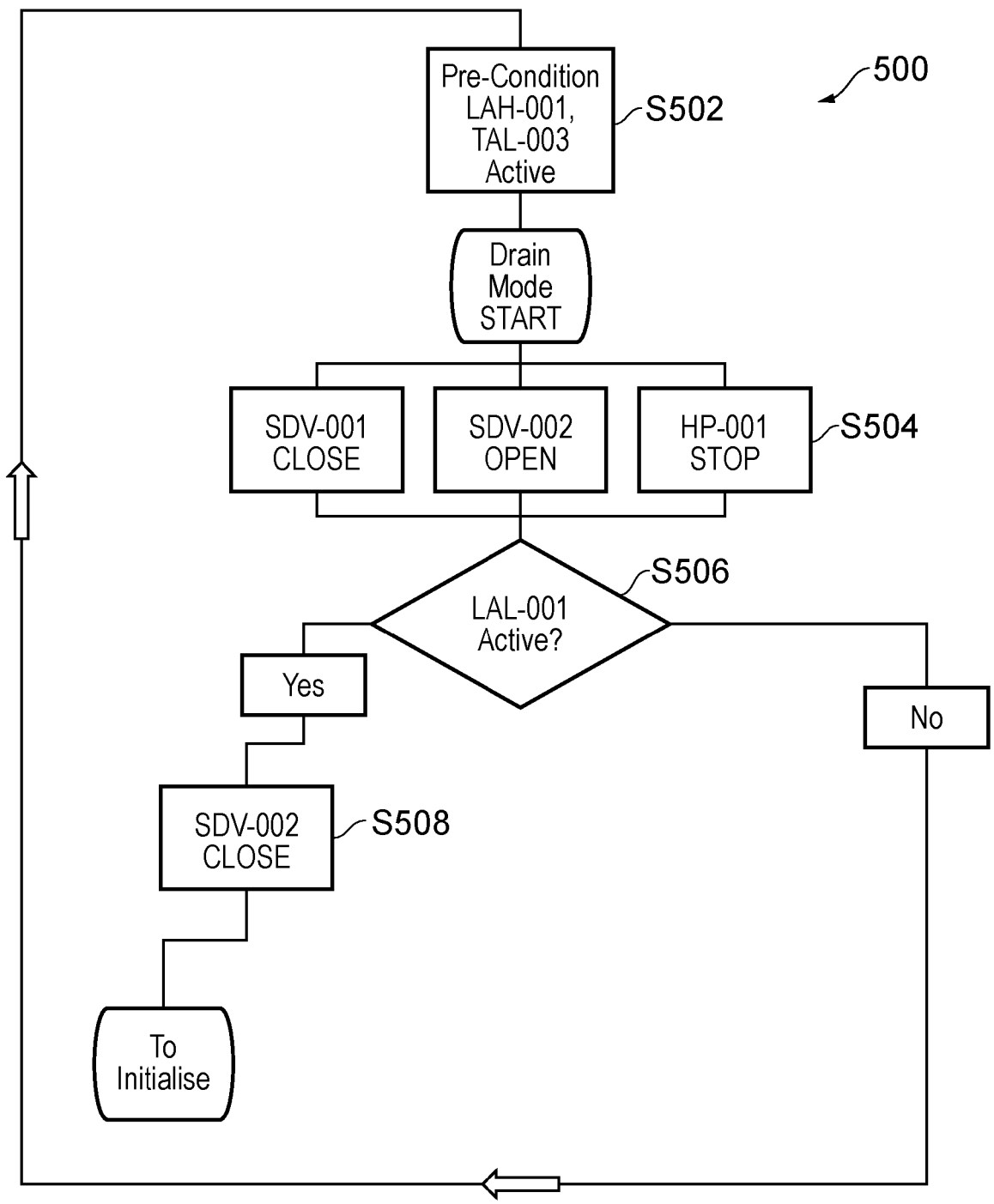
FIG. 5 provides a flow chart showing a drain mode algorithm executed by the controller element of the apparatus in accordance with certain embodiments of the present invention.

At step S202, the controller element operates the cut-off valve element 109 to prevent fluid communication between the passive holding tank 101 and the active holding tank 102 via the passive outlet 104 and the active inlet 110 (SDV-001 CLOSE), operates the exit-valve element 115 to prevent exit of waste-liquid from the active holding tank 102 via the exit path 113 (SDV-002 CLOSE) and operates the heat pump 111 to not transfer heat energy from waste-liquid in the active holding tank 102 (i.e. stops the heat pump 111, HP-001 STOP). At step S204, the controller element checks whether a signal is being received from the low liquid volume sensor 116. If a signal is being received from the low liquid volume sensor 116 (LAL-001 active) (i.e. waste-liquid in the active holding tank 102 is equal to or less than a predetermined low threshold volume) the controller element executes a fill mode algorithm 300 (as shown in FIG. 3 and described below). If a signal is not being received from the low liquid volume sensor 116 (LAL-001 not active) (i.e. the waste-liquid in the active holding tank 102 is greater than the predetermined low threshold volume) the controller element moves to step S206. At step S206, the controller element checks whether a signal is being received from the high liquid volume sensor 118 (i.e. waste-liquid in the active holding tank 102 is equal to or greater than a predetermined high threshold volume). If a signal is not being received from the high liquid volume sensor 118 (LAH-001 not active) (i.e. the volume of waste-liquid in the active holding tank 102 is less than the predetermined high threshold volume) the controller element executes the fill mode algorithm 300. If a signal is being received from the high liquid volume sensor 118 (LAH-001 active), the controller element moves to step S208. At step S208, the controller element checks whether a high temperature signal (TAH-003) is being received from the temperature sensor 117 (TAH-003 active) (i.e. the temperature of waste-liquid in the active holding tank 102 is equal to or greater than a predetermined high threshold temperature). If a high temperature signal is being received from the temperature sensor 117, the controller element executes a heat extraction mode algorithm 400 (as shown in FIG. 4 and described below). If a high temperature signal has is not being received from the temperature sensor 117 (TAH-003 not active), the controller element moves to step S210. At step S210, the controller element checks whether a low temperature signal (TAL-003) is being received from the temperature sensor 117 (i.e. the temperature of the waste-liquid in the active holding tank 102 is equal to or less than a predetermined low threshold temperature). If a low temperature signal is being received from the temperature sensor 117 (TAL-003 active), the controller element executes a drain mode algorithm 500 (as shown in FIG. 5 and described below). If a low temperature signal is not being received from the temperature sensor 117 (TAL-003 not active), the controller element executes the heat extraction mode algorithm 400. The predetermined high threshold temperature, predetermined low threshold temperature, predetermined high threshold volume signal and the predetermined low volume threshold signal are configurable to desired values which may be dependent on the conditions, location and situation for which the apparatus 100 is being used. By way of example a high threshold temperature may be equal to or greater than 10° C. and a low threshold temperature may be equal to or less than 3° C. The low threshold volume may be a volume of waste-liquid in the active holding tank 102 that is below a volume that fully submerges the evaporator coil 112. A high threshold volume may be a volume of waste-liquid in the active holding tank 102 that is greater than a volume that is able to fully submerge the evaporator coil 112. Other suitable predetermined volume and temperature thresholds will be known to those skilled in the art and may be selected dependent on the conditions, situation and/or location where the apparatus 100 is to be used.

FIG. 3 provides a flow chart showing the fill mode algorithm 300 that is executable by the controller element. At step S302, the controller element checks whether a signal is being received from the high liquid volume sensor 118. If a signal is not being received from the high liquid volume sensor 118 (LAH-001 not active), the controller element moves to step S304. At step S304, the controller element operates the heat pump 111 to not transfer heat energy from waste-liquid in the active holding tank 102 (i.e. stops the heat pump 111, HP-001 STOP), operates the exit-valve element 115 to prevent exit of waste-liquid from the active holding tank 102 via the exit path 113 (SDV-002 CLOSE) and operates the cut-off valve element 109 to provide fluid communication between the passive holding tank 101 and the active holding tank 102 via the passive outlet 104 and the active inlet 110 (SDV-001 OPEN), therefore allowing waste-liquid to transfer from the passive holding tank 101 to the active holding tank 102 via the passive outlet 104 and the active inlet 110. At step S306, the controller element checks whether a signal is being received from the high liquid volume sensor 118. If a signal is not being been received from the high liquid volume sensor 118 (LAH-001 not active) the controller element moves back to step S302. If a signal is being received from the high liquid volume sensor 118 (LAH-001 active), the controller element moves to step S308. At step S308, the controller element operates the cut-off valve element 109 to prevent fluid communication between the passive holding tank 101 and the active holding tank 102 via the passive outlet 104 and the active inlet 110 (SDV-001 CLOSE) and moves to step S310. At step S310, the controller element checks whether a high temperature signal from the temperature sensor 117 (TAH-003) is being received. If a high temperature signal is being received (TAH-003 active), the controller element executes the heat extraction mode algorithm 400. If a high temperature signal is not being received (TAH-003 not active), the controller element moves to step S312. At step S312, the controller element checks whether a low temperature signal from the temperature sensor 117 (TAL-003) is being received. If a low temperature signal is being received (TAL-003 active), the controller executes the drain mode algorithm 500. If a low temperature signal is not being been received (TAL-003 not active), the controller element executes the heat extraction mode algorithm 400.

FIG. 4 provides a flow chart showing the heat extraction mode algorithm 400 executable by the controller element. At step S402, the controller element checks whether a signal is being received from the high liquid volume sensor 118 (LAL-001) and checks whether a high temperature signal is being received from the temperature sensor 117 (TAH-003). If a high temperature signal and a high liquid volume signal are being received (TAH-003 active and LAH-001 active) the controller element moves to step S404. At step S404, the controller element operates the exit-valve element 115 to prevent exit of waste liquid from the active holding tank 102 via the exit-path 113 (SDV-002 close), operates the cut-off valve element 109 to prevent fluid communication between the passive holding 101 and the active holding tank 102 via the passive outlet 104 and the active inlet 110 (SDV-002 CLOSE) and operates the heat pump 111 to transfer heat energy from waste-liquid in the active-holding tank 102 (i.e. starts heat pump 111, HP-001 START). The controller element then moves to step S406. At step S406, the controller element checks whether a low temperature signal is being received from the temperature sensor 117. If a low temperature signal is not being received (HAL-003 not active), the controller element moves back to step S402. If a low temperature signal is being received (HAL-003 active), the controller element moves to step S408. At step S408, the controller element operates the heat pump 111 to not transfer heat energy from waste-liquid in the active holding tank 102 (i.e. stops the heat pump 111, HP-001 STOP) and then moves to step S410. At step S410, the controller element checks whether a signal is being received from the high liquid volume sensor 118. If a signal is being received from the high liquid volume sensor 118 (LAH-001 active), the controller element executes the drain mode algorithm 500. If a high liquid volume sensor is not being been received (LAH-001 not active), the controller element executes the fill mode algorithm 300.

FIG. 5 provides a flow chart showing the drain mode algorithm 500 executable by the controller element. At step S502, the controller element checks whether a signal is being received from the high liquid volume sensor 118 and checks whether a low temperature signal is being received from the temperature sensor 117. If a low temperature signal and a signal from the high liquid volume sensor 118 are being received (TAL-003 active and LAH-001 active) the controller element moves to step S504. At step S504, the controller element operates the heat pump 111 to not transfer heat energy from waste-liquid in the active holding tank 102 (i.e. turns off the heat pump 111, HP-001 stop), operates the cut-off valve element 109 to prevent fluid communication between the passive holding tank 101 and the active holding tank 102 via the passive outlet 104 and the active inlet 110 (SDV-001 CLOSE) and operates the exit-valve element 115 to allow exit of waste-liquid from the active holding tank 102 via the exit path 113 (SDV-002 OPEN). The controller element then moves to step S506. At step S506, the controller element checks whether a signal is being received from the low liquid volume sensor 116. If a signal from the low liquid volume sensor 116 is not being received (LAH-001 not active), the controller element moves back to step S502. If a signal from the low liquid volume sensor 116 is being received (LAH-001 active), the controller element moves to step S508. At step S508, the controller element operates the exit-valve element 115 to prevent exit of waste-liquid from the active holding tank 102 via the exit path 113 (SDV-002 CLOSE) and executes the initialise mode algorithm 200.

Certain embodiments of the present invention therefore may help provide for improved heat recovery/transfer from a waste-liquid. By using a heat exchanger and selectively operating a heat pump 111, certain embodiments of the present invention may help improve the efficiency of heat recovery because the heat pump 111 (that may require input of electrical energy to operate) may be selectively and automatically operated when the heat exchanger (that may not require any input of electrical energy to operate) may not have transferred all the possibly recoverable heat energy from waste-liquid. Combining a heat exchanger and a heat pump 111 may also help to reduce the affect fluctuations in the temperature of incoming target fluids may have on the amount of heat energy that can be recovered from waste-liquid, such as grey-water, because the heat pump 111 may not require a positive temperature gradient between the refrigerant or other suitable further target fluids to operate. Certain embodiments of the present invention also help mitigate the effects of discontinuous/inconsistent waste-liquid and/or target fluid flow by storing waste-liquid in containers and using a controller element to control the movement of waste-liquid and the operation of the heat pump 111 to improve efficiency of heat energy transfer from the waste-liquid. Certain embodiments of the present invention may also provide cooled waste-liquid for other applications such as HVAC systems, toilets, irrigation, or the like by connecting the system so as to recycle the cooled waste-liquid that exits the active holding tank 102. Certain embodiments of the present invention may provide a system and method for recovering heat energy from grey-water that may be less-complex and may help with ease of installing in an existing drainage/water system of a domestic and/or commercial building and which may be configured to help reduce water heating and energy costs.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for transferring heat energy from a waste-liquid, comprising:
   at least one heat exchange element for transferring heat energy from waste-liquid in a first container to a first target fluid;
   at least one heat pump element for transferring heat energy from waste-liquid transferred from the first container to a further container;
   at least one selectively operable exit-valve element for selectively providing at least one fluid communication path for allowing waste-liquid to exit from the further container; and
   at least one controller element for selectively operating the heat pump element to transfer heat energy from waste-liquid in the further container to a further target fluid and/or for selectively operating the at least one selectively operable exit-valve element.

2. The apparatus as claimed in claim 1, wherein the at least one heat exchange element is located in the first container and the at least one heat pump element is located in the further container.

3. The apparatus as claimed in claim 1, further comprising at least one selectively operable cut-off valve element for selectively providing or preventing fluid communication between the first container and the further container.

4. The apparatus as claimed in claim 1, wherein the first container comprises at least one fluid receiving inlet for receiving waste-liquid.

5. The apparatus as claimed in claim 1, further comprising at least one baffle element located in the first and/or the further container for improving at least one or more of, retention time of waste liquid, heat energy transfer from waste liquid and/or flow of waste-liquid in the first container and/or the further container.

6. The apparatus as claimed in claim 1, wherein the first container comprises a volume equal to or greater than a volume of the further container.

7. The apparatus as claimed in claim 1, further comprising at least one parameter sensor to provide the at least one controller element with at least one corresponding control signal.

8. The apparatus as claimed in claim 7, wherein:
   the at least one parameter sensor comprises at least one temperature sensor and/or at least one volume sensor, and
   the volume sensor is at least one liquid level sensor.

9. The apparatus as claimed in claim 1, wherein:
   the at least one selectively operable exit-valve element is selectively operated by the at least one controller element when the temperature of waste-liquid in the further container is equal to or less than a predetermined low threshold temperature to allow exit of waste-liquid from the further container, or
   the least one selectively operable exit-valve element is selectively operated by the at least one controller element when the temperature of waste-liquid in the further container is equal to or greater than a predetermined high threshold temperature to prevent exit of waste-liquid from the further container.

10. The apparatus as claimed in claim 1, wherein:
the at least one selectively operable exit-valve element is selectively operated by the at least one controller element when the volume of waste-liquid in the further container is equal to or less than a predetermined low threshold volume to prevent exit of waste-liquid from the further container, or
the at least one selectively operable exit-valve element is selectively operated by the at least one controller element when the volume of waste-liquid in the further container is equal to or greater than a predetermined high threshold volume to allow exit of waste-liquid from the further container.

11. The apparatus as claimed in claim 1, wherein:
the at least one selectively operable cut-off valve element is selectively operated by the at least one controller element when the volume of waste-liquid in the further container is equal to or greater than a predetermined high threshold volume to prevent fluid communication between the first and further container, or
the at least one selectively operable cut-off valve element is selectively operated by the at least one controller element when the volume of waste-liquid in the further container is equal to or less than a predetermined low threshold volume to provide fluid communication between the first and further container.

12. The apparatus as claimed in claim 1, wherein:
the at least one controller element operates the at least one heat pump element to not transfer heat energy from waste-liquid in the further container when the temperature of waste-liquid in the further container is equal to or less than a predetermined low threshold temperature or
the at least one controller element operates the at least one heat pump element to transfer heat energy from waste-liquid in the further container when the temperature of waste-liquid in the further container is equal to or greater than a predetermined high threshold temperature.

13. The apparatus as claimed in claim 1, wherein:
the at least one controller element operates the at least one heat pump element to transfer heat energy from waste-liquid in the further container when the volume of waste-liquid in the further container is equal to or greater than a predetermined high threshold volume, or
the at least one controller element operates the at least one heat pump element to not transfer heat energy from waste-liquid in the further container when the volume of waste-liquid in the further container is equal to or less than a predetermined low threshold volume.

14. The apparatus as claimed in claim 1, wherein the first target fluid is at a temperature in the range of 1° C. to 30° C.

15. The apparatus as claimed in claim 1, wherein the waste-liquid is at a temperature in the range of 1° C. to 90° C.

16. A method for transferring heat energy from a waste-liquid, comprising:
receiving waste-liquid in a first container;
transferring heat energy from waste-liquid in the first container to a first target fluid located in an at least one heat exchange element;
transferring waste-liquid from the first container to a further container;
selectively operating at least one heat pump element to transfer heat energy from waste-liquid in the further container to a further target fluid; and
selectively operating at least one selectively operable exit-valve element for respectively allowing or preventing waste-liquid to exit from the further container.

17. The method as claimed in claim 16, whereby operation of the at least one heat pump element and/or the at least one selectively operable exit-valve element is selected in response to at least one sensed parameter of waste-liquid in the first container and/or the further container.

18. The method as claimed in claim 16, further comprising operating at least one selectively operable cut-off valve element located for selectively allowing or preventing fluid communication between the first container and the further container.

19. The method as claimed in claim 18, whereby operation of the at least one selectively operable cut-off valve is selected in response to at least one sensed parameter of waste-liquid in the first container and/or the further container.

20. The method as claimed in claim 16, whereby:
operation of the at least one selectively operable exit-valve element to allow exit of waste-liquid from the further container is in response to a temperature of waste-liquid in the further container equal to or less than a predetermined low threshold temperature, or
operation of the at least one selectively operable exit-valve element to prevent exit of waste-liquid from the further container is in response to a temperature of waste-liquid in the further container equal to or greater than a predetermined high threshold temperature.

21. The method as claimed in claim 16, whereby:
operation of the at least one selectively operable exit-valve element to allow exit of waste-liquid from the further container is in response to a volume of waste-liquid in the further container equal to or greater than a predetermined high threshold volume, or
operation of the at least one selectively operable exit-valve element to prevent exit of waste-liquid from the further container is in response to a volume of waste-liquid in the further container equal to or less than a predetermined low threshold volume.

22. The method as claimed in claim 16, whereby:
operation of the at least one heat pump element to transfer heat energy from waste-liquid in the further container is in response to a temperature of waste-liquid in the further container equal to or greater than a predetermined high threshold temperature, or
operation of the at least one heat pump element to not transfer heat energy from waste-liquid in the further container is in response to a temperature of waste-liquid in the further container equal to or less than a predetermined low threshold temperature.

23. The method as claimed in claim 16, whereby:
operation of the at least one heat pump element to not transfer heat energy from waste-liquid in the further container is in response to a volume of waste-liquid in the further container equal to or less than a predetermined low threshold volume, or
operation of the at least one heat pump element to transfer heat energy from waste-liquid in the further container is in response to a volume of waste-liquid in the further container equal to or greater than a predetermined low threshold volume.

24. The method as claimed in claim 18, whereby:
operation of the at least one selectively operable cut-off valve element to allow transfer of waste-liquid from the first container to the further container in response to a volume of waste-liquid in the further container equal to or less than a predetermined low threshold volume, or operation of the at least one selectively operable cut-off valve element to prevent transfer of waste-liquid from the first container to the further container in response to a volume of waste-liquid in the further container equal to or greater than a predetermined high threshold volume.

* * * * *